Feb. 20, 1962 R. H. BAIR 3,022,387

TELEPHONE ATTACHMENT

Filed Oct. 1, 1958 2 Sheets-Sheet 1

INVENTOR.
RICHARD H. BAIR
BY Harness, Pierce & Kurz
ATTORNEYS

Feb. 20, 1962 R. H. BAIR 3,022,387

TELEPHONE ATTACHMENT

Filed Oct. 1, 1958 2 Sheets-Sheet 2

INVENTOR.
RICHARD H. BAIR
BY Harmon, Pierce & Kurz
ATTORNEYS

United States Patent Office 3,022,387

Patented Feb. 20, 1962

3,022,387

TELEPHONE ATTACHMENT

Richard H. Bair, Camp Hill, Pa., assignor to Laura W. Triest, Annapolis, Md.

Filed Oct. 1, 1958, Ser. No. 764,581
8 Claims. (Cl. 179—182)

This invention relates generally to telephone attachments and more particularly to an attachment which enables more than one party to transmit or receive the voice over the telephone simultaneously.

The primary object of this invention is to provide a simulated telephone which constitutes an attachment by means of sound conducting tubes to a standard telephone whereby more than one party may use the standard telephone simultaneously.

A specific object of this invention is to provide a simple inexpensive simulated telephone unit for receiving and transmitting sound waves through attachment means to a standard telephone whereby more than one party may utilize the standard telephone simultaneously.

With the foregoing and other objects in view, the invention resides in the following specification and claims, certain embodiments and details of construction of which are illustrated in the accompanying drawings in which:

Figure 1:
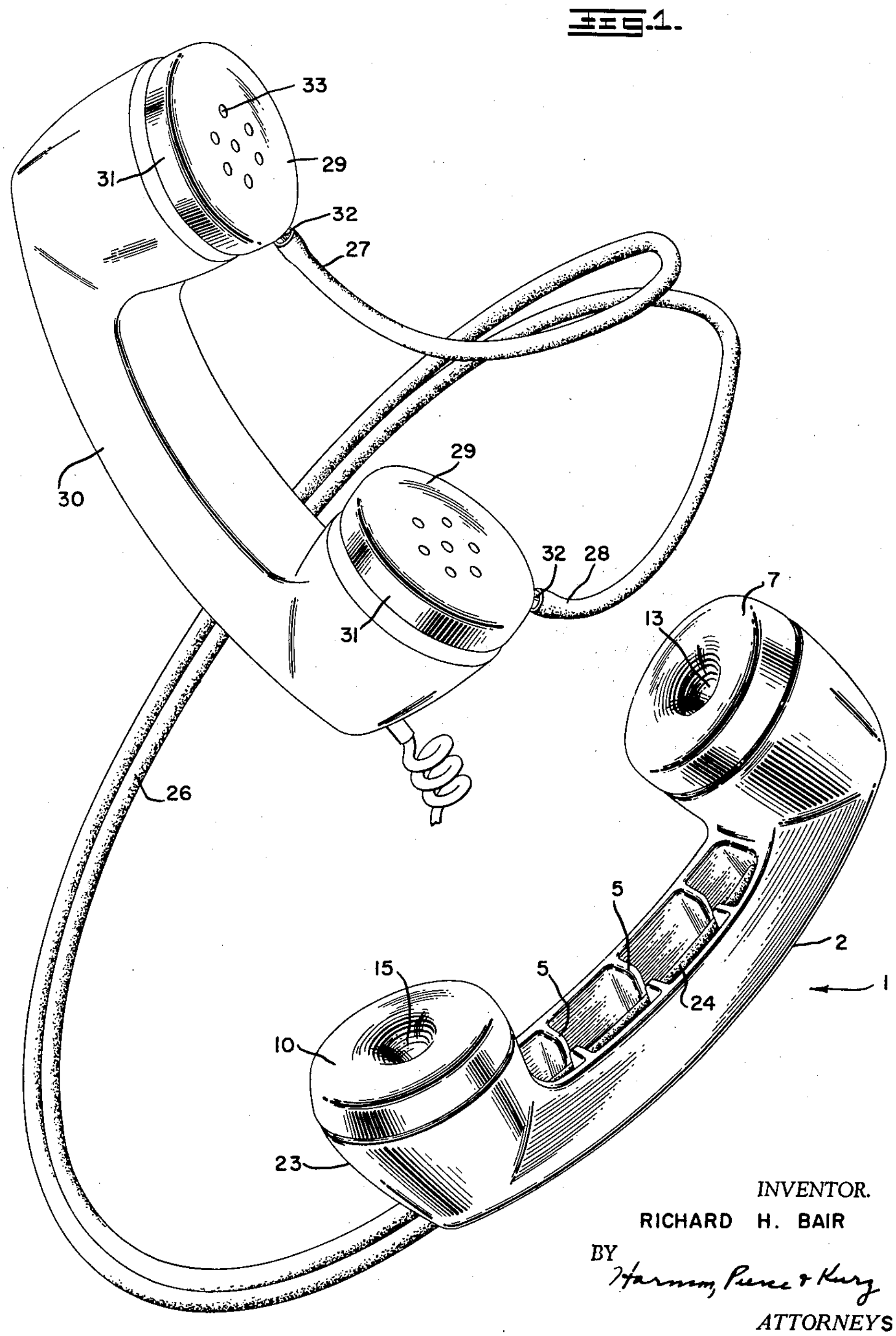
FIGURE 1 is a pictorial representation of the attachment comprising the invention as applied to a telephone.
Figure 2:
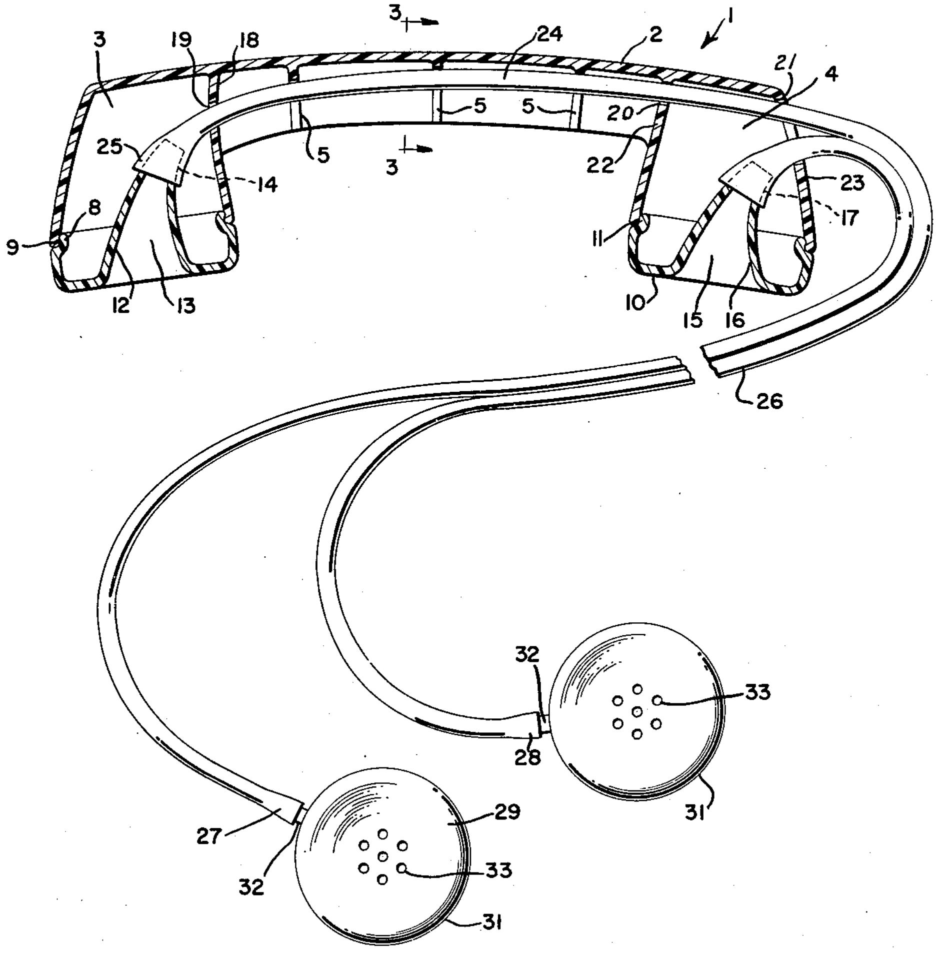
FIGURE 2 is an illustration of the attachment with the simulated telephone being shown in sectioned side elevation.
Figure 3:
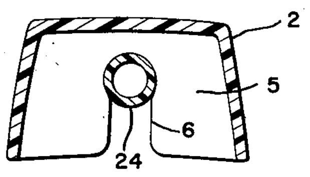
FIGURE 3 is a view taken along the lines 3—3 of FIGURE 2.

Referring more particularly to the drawings, a simulated telephone, indicated generally at 1, includes a unitary molded plastic body member 2, provided with cup-shaped pockets 3 and 4 at either end thereof. The body member 2 is channel-shaped in character and is provided between the pockets 3 and 4 with transversely directed ribs 5. The ribs 5 are provided with centrally disposed recesses 6 for a purpose to be later described. The ribs 5 constitute means for lending overall strength to the body member 2.

Overlying the pocket member 3 is a sound conducting element 7 provided with a terminal lip 8 which is detachably received in a recess 9 so that the element 7 may be readily attached or detached from the body member 2. The element 7 constitutes either a speaking or a listening terminus for the simulated telephone 1. An element 10, substantially identical to the element 7, is detachably secured over the pocket 4 by the rib and groove connection at 11 in a manner similar to the attachment means for the element 7. The element 10 will constitute the speaking terminus for the simulated telephone 1 if the element 7 is the listening terminus or vice versa.

Element 7 is provided with a centrally disposed wall 12 of horn-like character which defines an orifice 13 therein and which terminates in a hose receiving end portion 14. The element 10 is preferably identical in character to the element 7 and is likewise provided with a sound conducting orifice 15 within a horn-shaped wall area 16 and a hose terminus 17.

The wall 18 of pocket 3 is provided with an opening 19. The pocket 4 is provided with openings 20 and 21 in wall areas 22 and 23. A piece of sound conducting tubing 24 of hose-like character and preferably of smooth plastic material is received through the openings 21, 20 and 19 as described above, and the terminus 25 thereof is secured over the hose terminus 14 of element 7. Between the pockets 3 and 4 the tube 24 is frictionally held within the recesses 6 of the transverse ribs 5. A second sound conducting tube 26 similar to tube 24 is received through opening 21 and is frictionally secured to the hose terminus 17 of element 10. The tubes 24 and 26 may be individual in character but preferably comprise a single extruded plastic having dual parallel channels. Connected to the ends 27 and 28 of tubes 26 and 24 are identical sound confining and directing caps 29. Each cap preferably comprises a single piece of molded plastic material of cup-like character and having an internal diameter of such a dimension which will permit it to be frictionally engaged over the receiver or the transmitter portion of a telephone 30. The caps 29 are preferably provided with outwardly tapered walls 31 since most modern telephone instruments provide a similarly tapered structure at the receiver and the transmitter. Transversely extending from each cap are sound directing hose termini 32 to which the ends 27 and 28 of tubes 26 and 24 are connected.

When it is desired that more than one party simultaneously use the telephone 30, the caps 29 are secured to the transmitter and receiver portions of the telephone 30. The elements 7 and 10 on the simulated telephone then become secondary transmitters and receivers by which a second party may simultaneously listen to information received on the telephone 30 or may engage in a conversation as the case may be. Thus, if the element 7 is connected by the tube 24 to a cap 29 secured over the receiver of telephone 30, then the element 7 becomes the listening station for the simulated telephone 1. Likewise, if the element 10 is connected by the tube 26 to a cap 29 engaged over the transmitter of the telephone 30, then the element 10 becomes the transmitting station for the simulated telephone 1. In order that the attachment caps 29 will not completely muffle the sound in either direction through the telephone 30 to the normal user thereof, the said caps are provided with a plurality of orifices 33. Care must be taken that the orifices 33 are not too large in diameter or too little sound will be bypassed through the tubes 24 and 26 to the simulated telephone 1.

Thus it is seen that this invention provides a novel and useful attachment for standard telephone instruments whereby plural parties may listen simultaneously to an incoming message over the telephone or may engage in a simultaneous conversation with a party calling through the standard telephone. It is realized that the invention as illustrated and described is subject to numerous structural modifications which would be considered well within the scope of the invention, and it is intended that the inventor be limited only to a reasonable interpretation of the appended claims.

I claim:

1. An attachment for a telephone with a transmitter and a receiver to enable multiple party use of a single telephone which comprises a body member of molded plastic material, said body member being provided with integral transverse ribs with recessed areas, said body member being further provided at each end with cup-shaped pockets, a sound conducting receiving element detachably secured over one of the pockets, a sound conducting speaking element detachably secured over the other of said pockets, a pair of sound confining and directing caps, one of said caps being releasably attached to the telephone transmitter and the other said cap being releasably attached to the telephone receiver, sound conducting tube means connecting the receiver attached cap to the receiving element of the body, and sound conducting tube means connecting the transmitter attached cap to the speaking element of the body.

2. The invention according to claim 1 wherein the caps are provided with perforations to aid in the normal use of the telephone while the attachment is secured thereto.

3. The invention according to claim 1 wherein the sound conducting tube means consists of a dual passage length of flexible tubing having good sound carrying properties.

4. The invention according to claim 1 wherein one of said sound conducting tubes is detachably supported in the recesses of body member ribs.

5. An attachment for a telephone with a transmitter and a receiver to enable multiple party use of a single telephone which comprises a body member of molded plastic material, said body member being provided with integral transverse ribs with recessed areas, said body member being further provided at each end with cup shaped pockets, a sound conducting receiving element detachably secured over one of the pockets, a sound conducting speaking element detachably secured over the other of said pockets, a pair of sound confining and directing caps, one of said caps being adapted to direct engagement with the telephone transmitter and the other said cap being adapted to direct engagement against the telephone receiver, said pair of caps being detachably connected to the telephone, sound conducting tube means connecting the receiver engaged cap to the receiving element of the body, and sound conducting tube means connecting the transmitter engaged cap to the speaking element of the body.

6. An attachment for a telephone with a transmitter and a receiver to enable multiple party use of a single telephone which comprises a body member simulating a telephone, said body member including a sound conducting receiving element and a sound conducting speaking element, a pair of sound conducting tubes, said body member being provided with suitable hollowed areas whereby one of said tubes is directed through a hollowed area of the body and into a supported sound conducting relationship with the receiving element and the other of said tubes is directed through the body and into a supported sound conducting relationship with the receiving element and the other of said tubes is directed through the body and into a supported sound conducting relationship with the speaking element, and a pair of sound confining and directing caps, each cap being connected with one of the sound conducting tubes, one of said caps being adapted to direct engagement with a telephone transmitter and the other cap being adapted to direct engagement against a telephone receiver, the attachment thereby rendering both the telephone and the member simulating a telephone capable of simultaneous multiple party sound transmission and reception.

7. An attachment for a telephone with a transmitter and a receiver to enable multiple party use of a single telephone which comprises a body member simulating a telephone, said body member including a sound conducting receiving element and a sound conducting speaking element, a pair of sound conducting tubes, said body member being provided with suitable hollowed areas whereby one of said tubes is directed through a hollowed area and into a supported sound conducting relationship with the receiving element and the other of said tubes is directed through the body and into a supported sound conducting relationship with the speaking element, and sound confining and directing cap means connected with said sound conducting tubes for cooperative engagement with the receiver and transmitter of a telephone, the attachment thereby rendering both the telephone and the member simulating a telephone capable of simultaneous multiple party sound transmission and reception.

8. An attachment for a telephone with a transmitter and a receiver to enable multiple party use of a single telephone which comprises a body member of molded plastic material, said body member being further provided at each end with cup shaped pockets, a sound conducting receiving element detachably secured over one of the pockets, a sound conducting speaking element detachably secured over the other of said pockets, a pair of sound confining and directing caps, one of said caps being adapted to direct engagement with the telephone transmitter and the other said cap being adapted to direct engagement against the telephone receiver, sound conducting tube means connecting the receiver engaged cap to the receiving element of the body, and sound conducting tube means connecting the transmitter engaged cap to the speaking element of the body.

References Cited in the file of this patent

UNITED STATES PATENTS

| | | |
|---|---|---|
| 1,204,136 | Creveling | Nov. 7, 1916 |

FOREIGN PATENTS

| | | |
|---|---|---|
| 452,186 | Great Britain | Aug. 18, 1936 |